United States Patent [19]

Neubauer

[11] Patent Number: 5,199,558
[45] Date of Patent: Apr. 6, 1993

[54] ELECTRIC PUSH BUTTON SWITCH, ESPECIALLY HAZARD-WARNING-SIGNAL SWITCH FOR MOTOR VEHICLES

[75] Inventor: Walter Neubauer, Lauffen, Fed. Rep. of Germany

[73] Assignee: SWF Auto-Electric GmbH, Beitigheim-Bissingen, Fed. Rep. of Germany

[21] Appl. No.: 720,472
[22] PCT Filed: Oct. 29, 1990
[86] PCT No.: PCT/EP90/01927
§ 371 Date: Jul. 19, 1991
§ 102(e) Date: Jul. 19, 1991
[87] PCT Pub. No.: WO91/06966
PCT Pub. Date: May 16, 1991

[30] Foreign Application Priority Data

Nov. 2, 1989 [DE] Fed. Rep. of Germany ....... 3936380

[51] Int. Cl.⁵ ............................................. H01H 13/12
[52] U.S. Cl. .................................. 200/531; 200/61.54; 200/524; 200/345
[58] Field of Search ................ 200/523, 524, 530, 531, 200/61.54, DIG. 39, 520, 525, 526, 528, 532, 341, 345

[56] References Cited

U.S. PATENT DOCUMENTS

| 4,001,526 | 1/1977 | Olson | 200/524 X |
| 4,382,167 | 5/1983 | Maruyama et al. | 200/524 |
| 4,531,026 | 7/1985 | Terajima et al. | 200/524 X |
| 4,585,914 | 4/1986 | Ohashi et al. | 200/524 X |
| 4,661,667 | 4/1987 | Sorimachi et al. | 200/524 X |
| 4,870,229 | 9/1989 | Kawase et al. | 200/524 X |
| 4,877,931 | 10/1989 | Kawase et al. | 200/524 X |
| 4,891,475 | 1/1990 | Wiersing et al. | 200/524 X |
| 4,916,276 | 4/1990 | Sasaki | 200/524 |
| 4,937,409 | 6/1990 | Hayashi | 200/524 |
| 4,956,529 | 9/1990 | Ueno | 200/524 |

FOREIGN PATENT DOCUMENTS

| 1813317 | 6/1970 | Fed. Rep. of Germany . |
| 2458843 | 6/1976 | Fed. Rep. of Germany . |
| 2816869 | 10/1979 | Fed. Rep. of Germany ...... 200/524 |
| 3544804 | 6/1987 | Fed. Rep. of Germany . |
| 2497397 | 7/1982 | France . |

Primary Examiner—Henry J. Recla
Assistant Examiner—Glen T. Barrett
Attorney, Agent, or Firm—Robert P. Seitter; J. Gordon Lewis

[57] ABSTRACT

The invention is based on an electric push button switch, especially a hazard-warning-signal switch for motor vehicles. This switch comprises a socket with stationary contacts, a cap-like linearly actuable push button and a slide which is at least partly located inside the push button and is movable in the direction of motion of the push button together with the push button. In order to obtain a compact construction of the electric push button switch, the slide is held on the push button at a distance from a first side wall of the push button and the socket projects into the push button and is substantially located there between the slide and the first side wall of the push button.

34 Claims, 3 Drawing Sheets

ELECTRIC PUSH BUTTON SWITCH, ESPECIALLY HAZARD-WARNING-SIGNAL SWITCH FOR MOTOR VEHICLES

BACKGROUND OF THE INVENTION

1. Field of the Invention

This invention is based on an electric push button switch which is in particular to be used as a hazard-warning-signal switch for motor vehicles.

2. Description of the Prior Art

A hazard-warning-signal switch is already known from the German patent 35 55 804. In this electric switch, the slide substantially consists of a first plate extending in the direction of actuation and carrying a movable electric contact and of a second plate that is integrally formed with the first plate, that extends perpendicularly to the direction of motion. The second plate extends across the inside of the push button switch and has beads on two opposite sides of its circumference, which beads are positioned in grooves on the inside of the push button. Due to the beads and grooves, the slide and push button are firmly connected to each other, whereby during assembly the slide has to be press fitted into the push button.

The first plate of the slide glides over a socket carrying the stationary contacts of the known electric switch. Because the second plate of the slide occupies the inside of the push button facing the socket, the known push button switch is relatively bulky.

SUMMARY OF THE INVENTION

The object of the invention is to provide an electric push button switch with a compact construction in which it is possible to assemble the separate parts of the push button switch in a simple manner.

According to the invention, an electric push button switch with a compact construction is achieved by the slide being held at a distance from a first side wall of the push button against an opposite second wall, and with the socket projecting into the push button substantially positioned in the space between the slide and the first side wall of the push button. The socket can thus project into the push button completely past the slide. Thus, also, stationary and movable contacts can be disposed in the interior of the push button so that the electric switch can be constructed in a compact manner.

So as to not have to guide the stationary contacts in form of metal paths running along the outside of the socket, the contacts penetrate the socket and are provided with terminal sections on the side of the socket opposite the slide. Especially the terminal section of at least one of the stationary contacts can also be positioned within the push button. An electric connection is fixed to the terminal section, which electric connection runs between the socket and a side wall of the push button, and thus this terminal section can be connected with the wiring of a motor vehicle in a space saving manner.

In order to avoid short circuits between the terminal sections of the stationary contacts and the cables fastened to them and in order to allow easy assembly, terminal sections of the stationary contacts are arranged in a row on at least one side area of the socket. Preferably a row of terminal sections of the stationary contacts is positioned on two opposite side areas of the socket.

If the slide and the socket lie next to each other to a large extent, a reset spring for the push button and the socket is compressed between the push button and the socket rather than between the slide and the socket. It is especially advantageous to compress the reset spring between the inside of the top of the push button and a facing abutment on the socket.

A guide pin for a helical reset spring projects from the top of the push button into its interior.

The guide pin can be made sufficiently long that the reset spring can be pushed onto it to be held during the assembly. An especially long guide pin is enabled by providing a receiver such as an aperture for receiving the guide pin into it. The guide pin can thus be formed sufficiently long that the helical spring is guided by it along its whole length.

Formed on opposite borders of the socket are walls extending in the direction of actuation of the push button, projecting from the socket, and guiding on side walls of the push button. Furthermore, the socket walls ensure that the cables fixed onto the terminal sections of the stationary contacts are not pushed too far through the terminal sections, making it easier to put the push button onto the socket.

For fastening the push button and the slide to each other they are coupled to each other in the direction of motion via a projection and a receiver on the slide and a second side wall of the push button preferably opposite the first side wall. Furthermore the slide is pressed against the second side wall of the push button by a resilient element acting between it and the push button so that the projection and receiver remain engaged within each other. Then the push button and the slide can easily be pre-assembled without loosening from each other. On the other hand, it is possible to loosen the slide from the push button by hand in a simple manner by moving the whole slide a little towards the resilient element so that the projection gets out of the receiver.

An embodiment is preferred, in which the resilient element is an extension which is integrally formed onto the inside top of the push button, projecting into the interior of the push button and engages under the slide. In order to have the extension quickly reach the right position under the slide, the slide projects in a direction perpendicular to the direction of actuation and parallel to the second side wall of the push button up to two further side walls of the push button. Preferably only small strips of the slide directly on the second side wall of the push button extend up to two further side walls of the push button. Two walls of the socket project out on both sides of the slide up to the strips so that the push button and slide are well guided on the socket.

BRIEF DESCRIPTION OF THE DRAWINGS

An embodiment of an electric push button switch according to the invention is illustrated in the drawings. By way of the Figures of these drawings the invention is described in more detail, in which.

DESCRIPTION OF THE PREFERRED EMBODIMENTS

Figure 1:
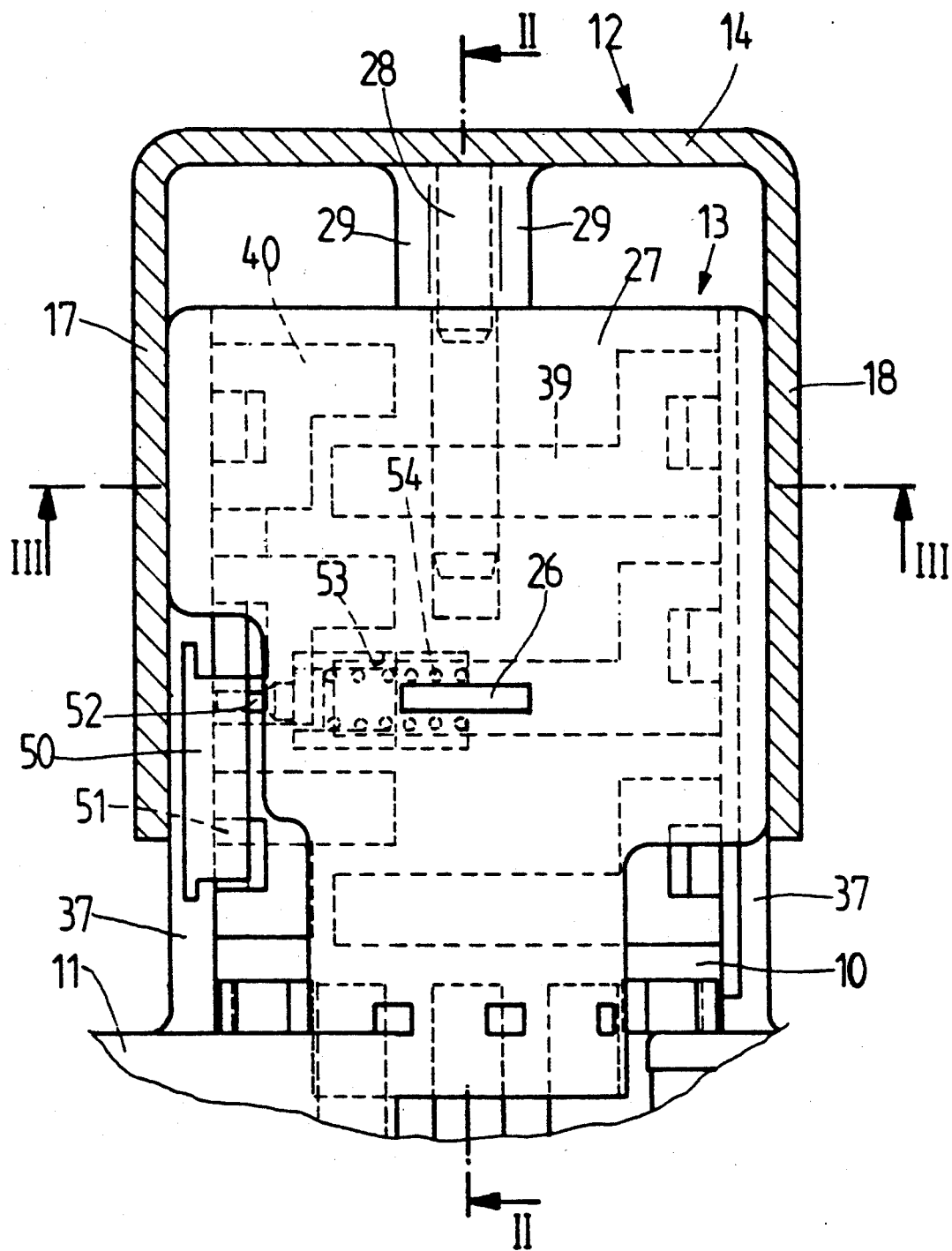
FIG. 1 is a view of a sectioned push button, showing the side of the slide away from the socket.

The illustrated electric push button switch comprises a socket 10 which is directly formed onto the base plate 11 of a steering column switch not illustrated any further. With respect to the socket 10, a cap-like push button 12 and a slide 13 are linearly actuable. The push button 12 and the slide 13 have two stable switching positions with respect to the socket 10, from one of which switching positions it can be switched over to the other by pushing down the push button 12.

The cap-like push button 12 consists of a top 14 and four side walls 15 to 18 which are perpendicularly arranged to the top 14 and two of which are running parallel to each other to form a rectangularly shaped internal cavity. The slide 13 is coextensive with the push button 12 for a substantial part of its length, and is held on the push button 12 spaced from the first side wall 15 and against the opposite second side wall 16. The slide 13 is held on the push button 12 independently of the socket 10 so that the push button 12 and the slide 13 can be preassembled to each other.

A rib-like projection 25 at the inside of the second side wall 16 and a respective receiver opening 26 in an adjacent side 27 of the slide 13 serve for coupling the push button 12 to the slide 13 in the direction of actuation. In the direction of actuation, the width of the receiver opening 26 approximately corresponds to the width of the projection 25 so that said projection 25 can easily be inserted into the receiver opening 26, while coupling the slide 13 and push button 12 together with minimal play.

The top side 27 of the slide 13 is pushed against the side wall 16 of the push button 12 by an elongated resilient extension element 28 which is integrally formed onto the inside of the top 14 of the push button 12 in the middle of two further side walls 17 and 18 of the push button 12, which extension element 28 projects into the interior of the push button 12 in the direction of actuation and engages the slide 13. At a distance from the top 14, the extension element 28 comprises an elongated pin, whereas immediately adjacent to the top 14 it is reinforced by two lateral wings 29. In order to have only a small distance between the slide 13 and the socket 10, the extension element 28 is positioned in a recess 30 of the slide 13, which recess 30 is open towards the top 14 and the socket 10, so that it can easily be removed from the mold. Due to the spacing of the extension element 28 from the side wall 16 of the push button 12, the recess 30 can be defined by wall 31 of the slide 13, against which wall 31 the extension element 28 is pressed and by which it pushes the slide 13 against the side wall 16 of the push button 12.

By the fact that the extension element 28 projects in the direction of actuation and is relatively narrow in perpendicular direction to it, it is made possible to arrange some of the linear series of bridging contacts 35 in the slide 13 on both sides of extension element 28, which bridging contacts 35 in their longitudinal direction also extend in the direction of actuation.

Figure 3:
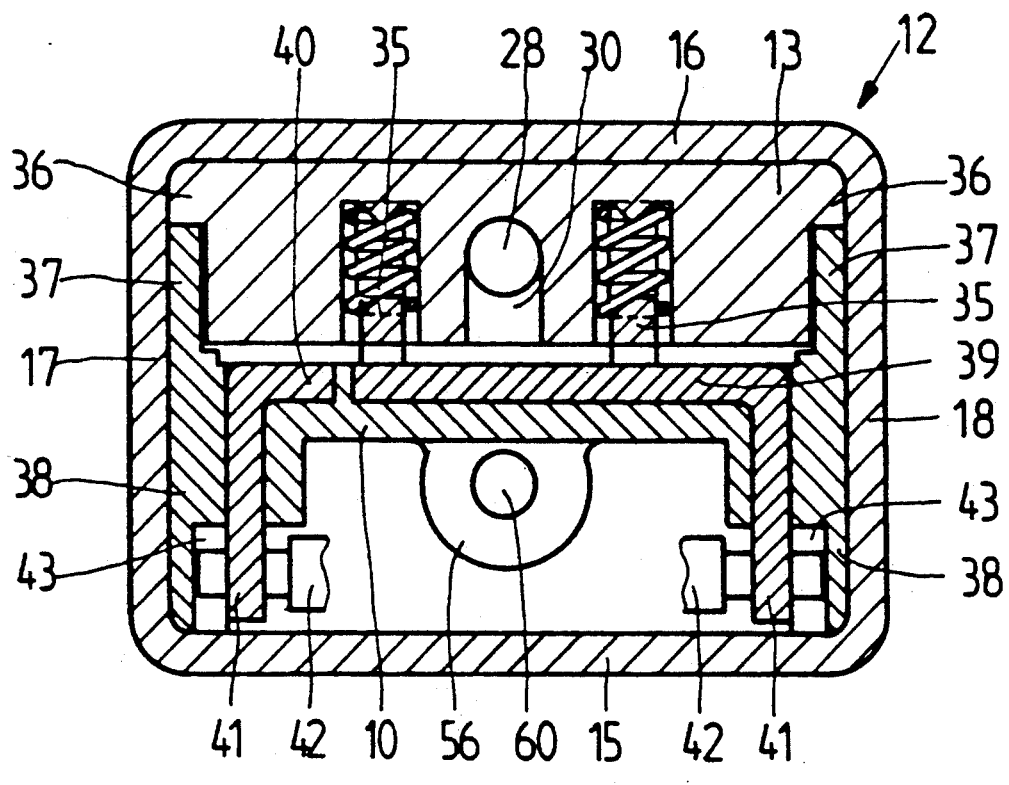
FIG. 3 is a section taken along the line III—III of FIG. 1.
Figure 4:
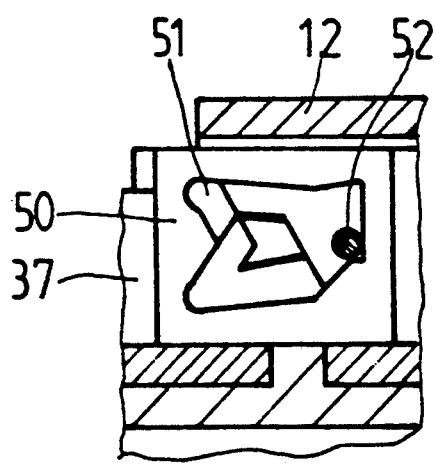
FIG. 4 is a view of the cam for the slide and the push button.

FIG. 3 makes clear that the extension 28 occupies only the space of a single bridging contact so as to allow the disposition of bridging contacts in the slide 13 on either side of the extension element 28.

When pre-assembling slide 13 and push button 12 to each other, the wall 31 of the slide is slightly tilted off from the side wall 16 and pushed between the projection 25 and the extension 28 into the push button 12. Thereby the extension 28 is deflected away until the projection 25 can snap into the receiver opening 26. Projection 25 and receiver opening 26 are positioned at a distance from the free end of the extension element 28 so that the extent of deflection is only slight. The insertibility of the slide 13 into the push button 12 could be improved by tapering slopes on the wall 31 or on the extension pin 28. However, then the length on which the extension element 28 lies against the slide 13 and the slide 13 lies against the side wall 16, is shortened and thus the hold of the slide 13 and the push button 12 to each is weakened.

The extension element 28 is shorter than the push button 12 so that inserting the extension element 28 into the recess 30 cannot be observed very well. However, for making the extension element 28 enter the recess without any difficulties, the slide 13 has two narrow strips 36 bearing directly on the second side wall 16 of the push button 12, by way of which strips 36 it extends up to two further side walls 17 and 18 of the push button 12. The strips 36 start off at the end of the slide 13 facing the top 14 of the push button 12 and project away from this end to a certain extent. They insure that the slide 13 is inserted exactly into the push button 12 so that the extension element 28 is automatically aligned to enter the recess 30.

The socket 10 is situated in the free space between the slide 13 and the first side wall 15 of the push button 12. In the pushed-down switching position it extends up close to the inside of the top 14 of the push button 12. The oppositely projecting side walls 37 and 38 on each side of the socket 10 extend lengthwise and define the direction of actuation. The walls 37 extend along either side of the slide 13 up to strips 36. The walls 38 project to the side wall 15 of the push button 12 up to said side wall 15. The walls 37 and 38 ensure that the push button 12 and the slide 13 are guided on the socket 10 without tilting.

Figure 2:
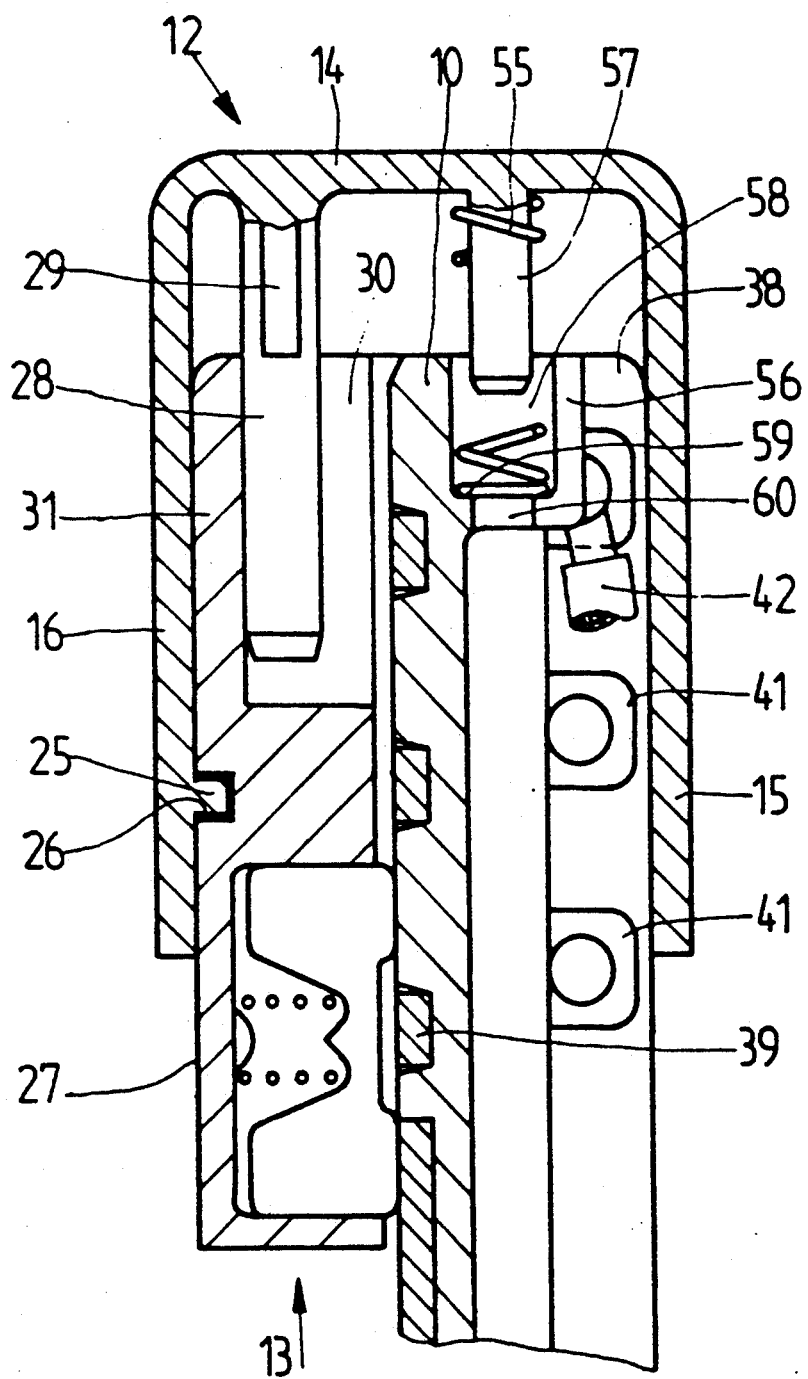
FIG. 2 is a section taken along line II—II of FIG. 1.

The socket 10 carries a linear series of different stationary contacts 39 and 40 punched out of a metal blank and bent into a perpendicular form. The stationary contacts have terminal sections 41 by which they penetrate the socket 10 and which are arranged inside on the walls 38 of the socket 10 in two rows, which rows extend in the direction of actuation. Cables 42 are fastened onto the terminal sections 41, which cables 42 are put through the terminal sections 41 from the inside and are wedge. In the walls 38 there are pockets 43 which on the one hand enable the cables 47 to be inserted far enough into the terminal sections 41 and which, on the other hand, however, also limit the extent of insertion. As it is made clear in FIG. 2, in which for reasons of clearness only one cable 42 is illustrated, at least some of the terminal sections 41 are totally inside of push button 12. Thus the cables 42 extend inside the push button 12 in the space between its first side wall 15 and the socket 10. By means of the great distance between the two rows of terminal sections 41, short circuits are prevented.

A plastic part 50 with a cardioid curve 51, generally known, is inserted into a side wall 37 of the socket 10, in which a peg 52 can move, which peg 52 is guided in a bore 53 of the slide 13 running cross-wise to the direction of actuation and is pushed into the cardioid curve 51 by a pressure spring 54 positioned in the bore.

A reset spring 55 is compressed between the top 14 of the push button 12 and the socket 10. On the socket 10, it is supported by an abutment 56 projecting from the socket 10 towards the side wall 15 of the push button 12. The reset spring 55 is guided by a pin 57 which is formed onto the inside of the top 14 of the push button 12 and is surrounded by the reset spring 55 and received in a bore 58 of the abutment 56. The bore 58 has a shoulder 59 for supporting the reset spring 55. In the bottom of the bore 58 there is an aperture 60 into which the guide pin 57 can be received. Therefore pin 57 can be quite long. The pin 47 could be received in the aperture 60 in the position of the push button 12 illustrated in FIG. 2 and thus guide the spring 55 along its whole length.

In the Figures, the push button 12 is shown in an off-position in which the peg 52 lies in a first groove of the cardioid curve 51 and prevents the reset spring 55 from moving the slide and the push button away from the socket. If the push button is pushed down, the peg 52 moves along the cardioid curve and enters a second groove of the cardioid curve 51 when releasing the push button. Thereby the push button 12 and the slide 13 are reset already a little by the spring 55. When pushing down the push button 12 again, the peg 52 is free again and returns into its original position due to the effect of the reset spring 55.

What is claimed is:

1. An electric push button switch comprising:
    a hollow push button linearly actuable in a direction of motion, said push button having an open ended interior cavity of a predetermined depth, said cavity being defined by pairs of opposite side walls and a top;
    a socket projecting into said interior cavity of said push button from the open end thereof; said socket being positioned adjacent one of said side walls, with an intervening space being defined between said socket and a second side wall opposite said one side wall;
    a slide projecting into said interior cavity in said push button in said intervening space between said socket and said second side wall opposite said one side wall, said slide being at least partially mounted to and carried by said push button such that said slide is movable with said push button along said direction of motion;
    means for mounting said slide against said second side wall of said push button such that said socket moves within said intervening space as said slide and push button move along said direction of motion;
    said slide having a linear series of bridging contacts within said interior cavity on a side of said slide facing said socket and said socket having a linear array of stationary contacts within said interior cavity on a slide of said socket facing said slide for selectively establishing electrical contact therewith, both said slide and said socket positioned side by side opposite each other and occupying most of said predetermined depth of said interior cavity of said push button.

2. The electric push button switch of claim 1 wherein:
    said socket is of a predetermined thickness;
    each of said stationary contacts extends through said predetermined thickness of said socket and includes a terminal section disposed on a side of said socket opposite from said side of said socket facing said slide;
    said terminal section of each of said stationary contacts being located in a space between said one side wall of said push button and a side of said socket opposite said side having said stationary contacts;
    an electrical connection fixed to said terminal section of each stationary contact and disposed in said space between said socket and said one side wall of said push button.

3. The electric push button switch of claim 1 further comprising:
    each of said stationary contacts having terminal sections;
    said terminal sections of each of said series of stationary contacts being arranged in a row on said one side of said socket.

4. The electric push button switch of claim 1 further comprising:
    biasing means, disposed between said push button and said socket, for biasing said push button away from said socket.

5. The electric push button switch of claim 4 wherein said biasing means comprises a spring compressed between said top of said push button and an abutment formed on said socket.

6. The electric push button switch of claim 5 further comprising:
    a guide pin mounted on and extending from said push button toward said socket;
    said spring disposed about said guide pin and seated on a seat formed on said abutment on said socket; and
    a pin receiver opening formed adjacent to said seat on said abutment for engaging said guide pin.

7. The electric push button switch of claim 1 wherein said means for mounting said slide to said push button comprises:
    a projection formed on and extending outward from said second one of said side walls of said push button;
    a projection receiver opening formed in said slide and receiving said projection therein; and
    means, acting between said slide and said push button, for resiliently biasing said slide toward said second side wall of said push button.

8. The electric push button switch of claim 7 wherein said top has an inside and said resilient biasing means comprises:
    an elongated resilient element formed on and extending away from said inside of said top of said push button having a free end, said resilient element extending into said interior cavity of said push button into engagement with said slide.

9. The electric push button switch of claim 8 further comprising:
    at least one bridging contact mounted on said slide and movable with said slide in the direction of motion of said push button and said slide; and wherein said resilient element is disposed adjacent to at least one of said bridging contacts.

10. The electric push button switch of claim 8 wherein said projection and said projection receiver opening are spaced from said free end of said resilient element.

11. The electric push button switch of claim 8 wherein
    said resilient element is disposed between at least two of said bridging contacts.

12. The electric push button switch of claim 8 wherein:
   a recess is formed in said slide opening toward said top of said push button; and
   said resilient element extends within said recess.

13. The electric push button switch of claim 8 wherein said resilient element comprises a pin extending from the inside of said top of said push button.

14. The electric push button switch of claim 7 wherein said slide extends out to two other opposing side walls of said push button.

15. The electric push button switch of claim 14 wherein
   said elongated resilient element has a shorter length than that of said push button; and
   said slide extends laterally to engage two other of said side walls of said push button.

16. The electric push button switch of claim 14 wherein:
   a pair of outwardly extending narrow strips are each formed on and extend outward from a respective side of said slide facing said second side wall of said push button;
   said narrow strips extending parallel to said side wall and into respective engagement with two other side walls of said push button; and
   said socket includes two wall projections disposed on opposite sides of said slide and extending toward and engaging a respective one of said narrow strips on said slide.

17. An electric push button switch comprising:
   a push button linearly actuable in a direction, said push button having first, second, third and fourth side walls and a top, each having an inside which together define an internal cavity;
   a slide having a length extending in the direction of said linear actuation, most of the length of said slide being positioned in said internal cavity in said push button;
   means for mounting said slide to said second side wall of said push button such that said slide is movable with said push button in the direction of actuation of said push button and is spaced from an opposed, first side wall of said push button;
   a socket having a length extending in said direction of linear actuation and a series of stationary contacts mounted along said length thereon, said socket projecting into said interior cavity of said push button between said slide and said first side wall of said push button with most of the length received therein to be positioned side by side with said slide within said interior cavity;
   said stationary contacts each extending through said socket and including a terminal section disposed on a side of said socket opposite from a side of said socket facing said slide;
   said terminal section of each of said stationary contacts being arranged in a row and located within said hollow interior of said push button;
   an electrical connection fixed to each terminal section of said stationary contacts and disposed between said socket and said first side wall of said push button;
   a reset spring interposed between the inside of said top of said push button and an abutment on said socket for normally biasing said push button away from said socket;
   a guide pin mounted on the inside of said top and extending from said push button toward said socket;
   said reset spring disposed about said guide pin and seated on a seat formed on said abutment on said socket;
   a pin receiver opening formed adjacent to said seat on said abutment for receiving said guide pin; and
   bridging contacts on said slide for establishing electrical connection with said stationary contacts on said socket.

18. The electric push button switch of claim 17 further comprising:
   a projection formed on and extending outward from said second side wall of the push button;
   a projection receiver opening formed in the slide and receiving said projection therein;
   an elongated resilient element comprising a pin having a fixed end formed on the inside of said top and a free end extending away from the inside of the top of said push button, said resilient element being of a shorter length than said push button and extending into said hollow interior cavity of said push button into engagement with said slide so as to urge said slide toward said second side wall of said push button;
   a recess formed in said slide, opening toward said inside of said top of said push button;
   said resilient element disposed within said recess;
   said projection and said projection receiver opening being spaced from said free end of said resilient element; and
   at least one of said bridging contacts mounted on said slide and
   disposed adjacent to said resilient element.

19. The electric push button switch of claim 18 further comprising:
   said slide having a front surface facing said second side wall of said push button having a pair of strips extending laterally into engagement with said third and fourth side walls of said push button respectively; and
   said socket includes two wall projections disposed on opposite sides of said slide and extending toward and engaging said respective strips on said slide.

20. An electric push button switch, especially a hazard-warning-signal switch for motor vehicles, comprising a socket with a plurality of stationary contacts, a cap-like linearly actuable push button having an internal cavity defined by a plurality of side walls and a top, and a slide which is positioned at least partly inside said internal cavity of said push button and which is movable together with said push button along a direction of actuation, means for mounting said slide on said push button spaced at a distance from a first one of said side walls of the push button and against an opposite second one of said side walls, and said socket projects into said internal cavity of said push button and is substantially located in the space between said slide and said first one of said side walls of said push button; said means for mounting said slide to said push button comprising a projection receiver opening on said slide and a projection formed on said second of said side walls of said push button, and a resilient element formed on said push button and having a free end engaging said slide so as to push said slide against said second one of said side walls of said push button.

21. An electric push button switch according to claim 20 wherein said stationary contacts penetrate said socket from a side adjacent said slide and are provided with terminal sections on a side opposite said side adjacent said slide, wherein said terminal section of at least one of said stationary contacts is located inside said internal cavity of said push button and wherein an electric connection is fixed onto said terminal section wherein said electric connection runs between said socket and said first one of said side walls of said push button.

22. An electric push button switch according to claim 21, wherein terminal sections of said stationary contacts are arranged in a row on said side of said socket opposite said side adjacent said slide.

23. An electric push button switch according to claim 20, wherein a reset spring is compressed between said push button and said socket.

24. An electric push button switch according to claim 23, wherein said reset spring is compressed between the inside of said top of said push button and an abutment on said socket.

25. An electric push button switch according to claim 24, wherein said reset spring is a helical spring, and wherein a guide pin extends from said inside of said top of said push button, a supporting area for the reset spring is formed on said abutment, and a pin receiver opening for receiving said guide pin is formed in said abutment.

26. An electric push button switch according to claim 20, further including a wall formed on each side of said socket and projecting in opposite directions and extending along each side of said socket in the direction of actuation.

27. An electric push button switch according to claim 20, wherein said resilient element is an extension which is integrally formed onto the inside of said top of said push button, and which projects into the interior cavity of said push button and engages said slide.

28. An electric push button switch according to claim 27, wherein said projection and said projection receiver opening are spaced from said free end of said extension.

29. An electric push button switch according to claim 27, and wherein said extension is situated beside said at least one bridging contact.

30. An electric push button switch according to claim 27, wherein said extension extends into a recess in said slide, said recess is open towards said top and is also open towards said socket.

31. An electric push button switch according to claim 27, wherein said extension comprises a pin.

32. An electric push button switch according to claim 20, wherein in a direction perpendicular to the direction of actuation and parallel to said second one of said side walls of said push button, said slide extends laterally to two other of said side walls of said push button.

33. An electric push button switch according to claim 32, wherein said extension has a length shorter than said push button.

34. An electric push button switch according to claim 33, wherein narrow strips formed on said slide are held directly against said second one of said side walls of said push button, said strips extending to said two further side walls respectively and wherein two walls are formed on said socket projecting into engagement with said strips respectively.

* * * * *